Dec. 19, 1967   L. F. PETTIT, JR., ET AL   3,359,403
ARC WELDING APPARATUS
Original Filed May 2, 1957   5 Sheets-Sheet 1

WITNESSES:

INVENTORS
Harry J. Bichsel &
Lewis F. Pettit, Jr.
BY
ATTORNEY

United States Patent Office 3,359,403
Patented Dec. 19, 1967

3,359,403
ARC WELDING APPARATUS
Lewis F. Pettit, Jr., Kenmore, N.Y., and Harry J. Bichsel, Brussels, Belgium, assignors to Westinghouse Electric Corporation, East Pittsburgh, Pa., a corporation of Pennsylvania
Continuation of application Ser. No. 656,547, May 2, 1957. This application Dec. 22, 1965, Ser. No. 522,012
6 Claims. (Cl. 219—131)

ABSTRACT OF THE DISCLOSURE

This application discloses a "constant-potential" arc welding apparatus of the consumable electrode type which embodies means for compensating for line voltage fluctuations whereby irregularities in the arc are prevented. The compensation is accomplished by sensing the voltage across the unregulated power supply lines to regulate variable voltage transformers whereby the voltage supplied to the power supply remains unaffected by changes in the power supply line voltage.

---

This application is a continuation of application Ser. No. 656,547 for Arc Welding Apparatus, filed May 2, 1957, to Lewis F. Pettit and Harry J. Bichsel and assigned to Westinghouse Electric Corporation, now abandoned.

This invention relates to the art of arc welding and has particular relationship to arc welding with a consumable electrode in a shield of a gas and specifically with a constant-potential supply or supply unit, as disclosed in Bichsel Patent 2,786,100. As is explained in the Bichsel patent, a constant-potential supply is a supply which at any setting operates with a relatively small drop in potential as the load current is increased and impresses substantially the same welding-arc potential between the electrode and the work over the whole range of welding current. The constant-potential supply should be distinguished from the source from which welding apparatus is energized. The constant-potential supply is part of a welding apparatus; the source is usually a commercial outlet or a prime mover.

Gas-shielded consumable-electrode arc-welding with a substantially constant-potential supply has been applied widely and highly successfully in industry, particularly for automatic and semi-automatic welding. But in certain situations unaccomuntable irregularities in the operation of the arc have been experienced. Thus, it has been found in welding ferrous metals, for example mild steel, with a ferrous (mild-steel) electrode in a shield of carbon dioxide that there is an unusually high percentage of arc outages, that stubbing tends to occur excessively frequently and that there is excessive metal spatter.

It is accordingly broadly an object of this invention to provide arc-welding apparatus for welding with a consumable electrode in a shield of a non-reactive gas and with the arc supplied from a substantially constant-potential supply unit in the use of which the above-described irregularities in arc operation shall not occur.

Another object of this invention is to reduce substantially the occurrence of the above-described irregularities in welding with a consumable electrode in a shield of a gas and with a welding-arc supply of the substantially constant-potential type, and more specifically it is an object of this invention to substantially reduce such irregularies in welding ferrous metal with a ferrous electrode in a shield of carbon dioxide.

In its broader aspects this invention arises from the discovery that the above-described irregularities result from variations in the source from which the welding apparatus is supplied and resulting variations in the constant welding arc potential. It has been found that unless the constant-potential of the supply at any setting is maintained between reasonably defined limits, the arc outages, stubbing and spatter described above occur. In addition, it has been found that where the constant potential is permitted to reach magnitudes outside of the limits, the quality of the welds becomes poor; the welds are porous and their surfaces take on undesirable contours.

It is then a specific object of this invention to provide arc-welding apparatus in the use of which the potential impressed between the electrode and the work shall remain substantially independent of the source potential and particularly such apparatus for welding with a consumable electrode in a gaseous shield and with a constant-potential supply.

A more general object of this invention is to provide a line or supply-voltage compensator particularly suitable for incorporation in constant-potential welding apparatus for the purpose of suppressing the above-described irregularies in the welding arc.

In accordance with this invention in its specific aspects, an arc welding combination is provided which includes a substantially constant-potential power supply unit with facilities for varying the magnitude of the constant potential and a compensating unit which responds to variations in the supply and causes the output potential of the supply unit to remain substantially unchanged in spite of variations in the source. The compensating unit includes apparatus for deriving a potential proportional to the supply and a reference potential. By comparing the proportional potential and reference potential, a compensating signal is derived when the source potential changes. When, in response to this signal, the power-supply unit is set to compensate for variations in the source potential, the compensating unit is reset to suppress the signal; the suppression of the signal means that a stable condition has been reached.

The novel features considered characteristic of this invention are disclosed generally above. The invention itself both as to its organization and its method of operation, together with additional objects and advantages thereof, will be understood from the following description of a specific embodiment when read in connection with the accompanying drawings, in which:

FIG. 8 is presented in an effort to help those skilled in the art to practice the invention and without any intention of limiting the scope of this invention in any way.

FIGS. 1 through 4 are graphs showing the maximum or optimum arc voltages as a function of the welding current observed in welding with a number of electrodes of different diameters and with the bead deposited at different rates. The data shown on these curves was obtained by making beads on flat plates of mild steel and a copper-coated electrode (Westinghouse MS21) of mild steel and the curves are applicable to burn-through and square-butt welds. The electrode used had essentially the following compositions:

| | Percent |
|---|---|
| Carbon | .08 to .13 |
| Silicon | .30 to .45 |
| Manganese | .80 to 1.10 |
| Sulfur, not more than | .03 |
| Phosphorus, not more than | .03 |
| Iron | Remainder |

Arc voltage in each case was measured directly between the electrode and the work. All measurements were taken with the welding nozzle from ½ to ⅝ inch from the work. Wide variations in results are obtained if nozzle to work spacing is varied.

Figure 1:
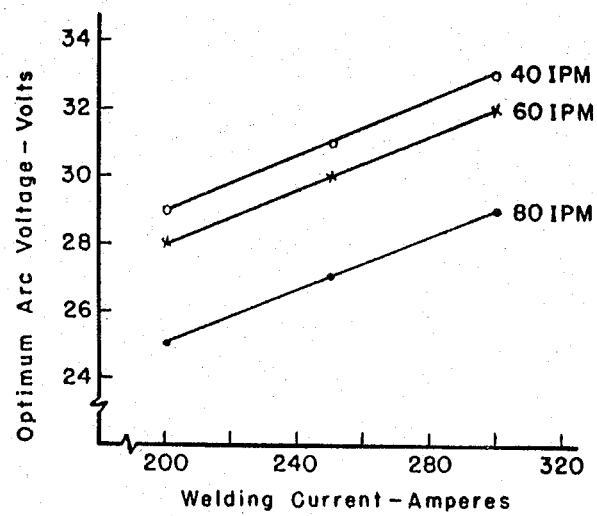
FIGURES 1 through 4 are graphs presenting the data derived in elaborate experimental work carried out to determine the causes of the irregularities in the welding arc in welding with a substantially constant-potential power supply unit in a non-reactive gas shield with a consumable electrode.
Figure 2:
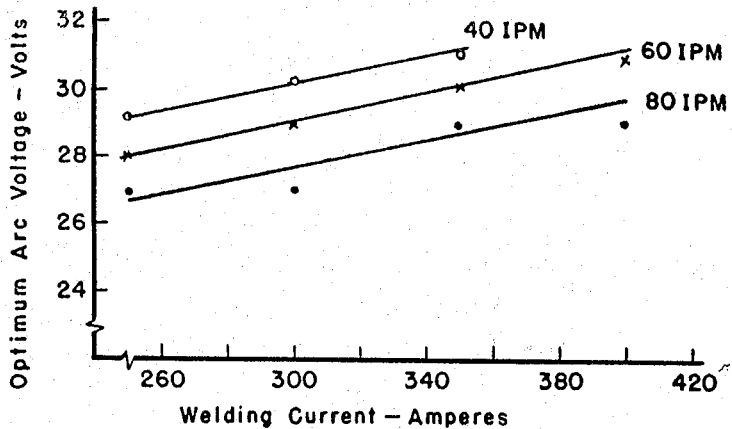
Figure 3:
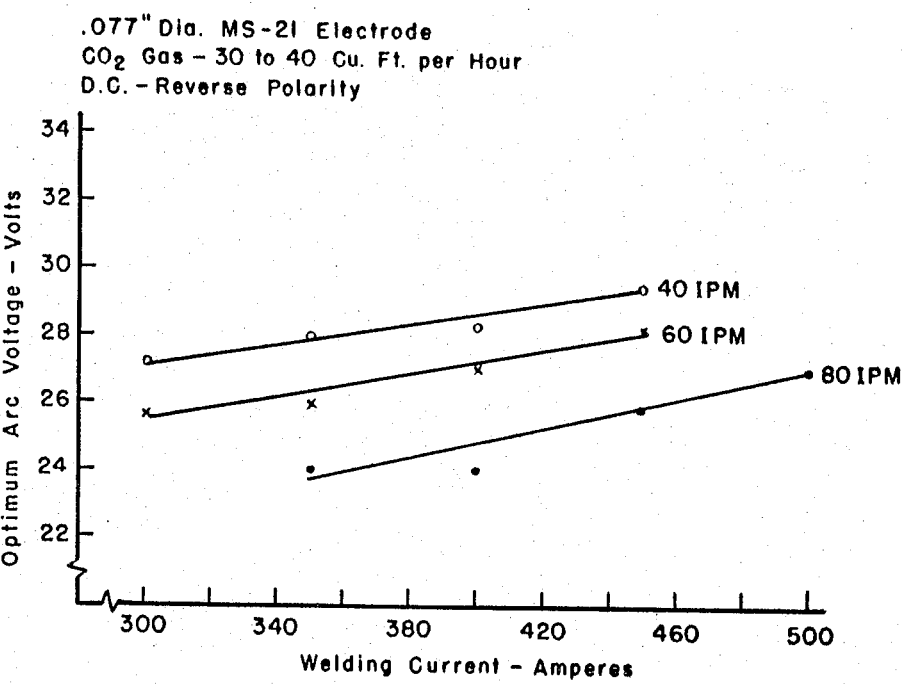
Figure 4:
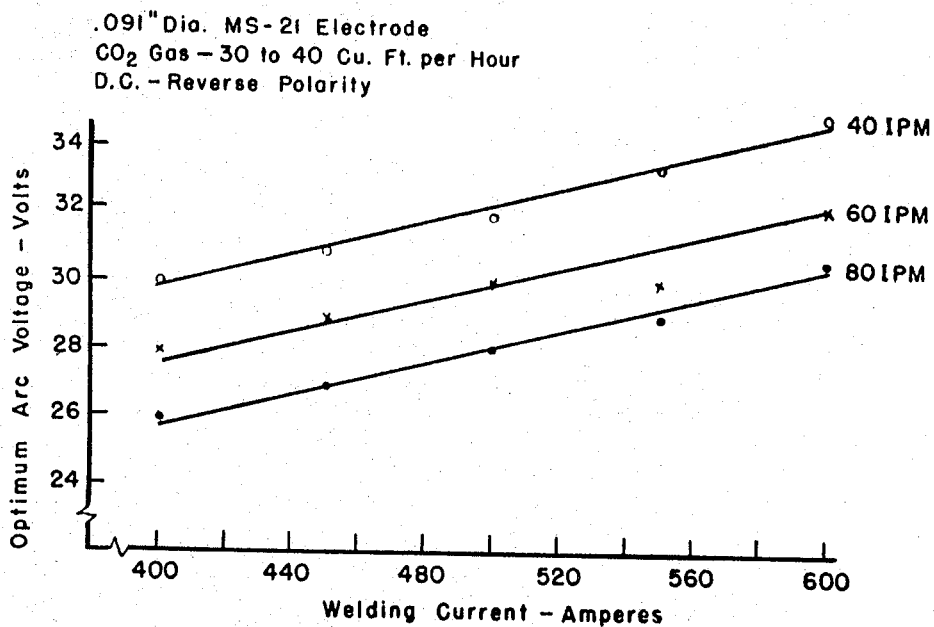

FIG. 1 presents the data obtained with an electrode of .040 inch diameter and the bead deposited at 40 inches, 60 inches and 80 inches per minute respectively. FIG. 2 presents data obtained with an electrode of .0625 inch diameter and the bead deposit the same as for FIG. 1. FIG. 3 presents the same data obtained using an electrode of .077 inch diameter and FIG. 4 the same data using an electrode of .091 inch diameter.

In general, the curves shown in FIGS. 1 through 4 show that:

(1) Optimum arc voltage increases as current is increased.

(2) Higher arc voltages are required at low welding speeds and lower arc voltages are required for high welding speeds.

(3) Higher arc voltages are required on small diameter electrode than on the larger diameter electrode for a given current. This is probably caused by the reduced voltage drop in the electrode as the diameter increases.

The work which was carried out to derive the data for the curves uncovered in addition the following phenomena:

(1) Each curve is not in fact a line but a band corresponding to ranges of voltage over which satisfactory welds are produced. The lines of FIGS. 1 through 4 lie within the band representing a fair mean. The width of this band is greatest for low welding speeds, small diameter and low currents. It is narrowest for high speeds, large diameter electrodes and high currents. For instance, at 40 inches per minute and 200 amperes, with .040 diameter electrode satisfactory beads are produced at any voltage between 22 and 32 volts, while with .091 electrode welding at 80 inches per minute and 600 amperes satisfactory welds are produced between 28 and 32 volts.

(2) If the arc voltage is too high, porosity results. Maximum usable voltage is between 30 and 35 volts, depending on the electrode diameter, speed and current selected.

(3) If the arc voltage is too low, excessive spatter and "stubbing" of the electrode to the work occurs.

(4) Bead contour is influenced markedly by arc voltage. Low arc voltages produce narrow, humped beads, while high voltages produce wide flat beads. This is common to most arc welding processes.

(5) If too high an arc voltage is impressed at high welding speeds, the bead is not continuous. Molten metal does not flow into the penetration groove but tends to agglomerate or "ball-up." This can usually be corrected by reducing the arc voltage and/or the speed.

(6) Maximum welding speed on flat plates appears to be at approximately 150 inches per minute using .091 diameter wire at 600 amperes and 23–24 arc voltage. Further increases in speed seem to be limited by the fact that further arc voltage reduction cannot be made since stubbing occurs.

(7) The carbon-dioxide shielded consumable-electrode welding process is a deep penetration process with penetration equal to or greater than the submerged arc process for a given voltage, current and speed. Minimum thickness of material which has been successfully butt welded using copper back-up sheets is ⅛ inch. While welds can be made with 3/32 (and thinner materials) the weldments tend to stick to the back-up causing rapid deterioration of the back-up. There is copper pick-up in the root of the weld and porosity is often encountered. Such specimens do not pass reverse bend tests.

The work which is summarized in FIGS. 1 through 4 and in the above discussion lead to the conclusion that the welding arc irregularities observed arise from variations in the constant welding-arc potential of the supply unit as a result of variations in the source potential. With the apparatus shown in FIGS. 5 through 8, this variation is suppressed and the welding arc irregularities are substantially eliminated.

This apparatus includes a Welder, a Power Supply Unit and a Compensating Unit. This apparatus is energized from a Source represented by the buses L1, L2, L3 of a polyphase power source which may be of the 220 or 440-volt type.

The Welder includes a gun G or torch through which a consumable electrode Z is supplied. A potential is impressed from the Power Supply Unit between the electrode Z and the work W and this potential maintains an arc between the electrode Z and the work W so that electrode material melted by the arc is deposited on the work. The arc is maintained in a gas shield S produced by gas supplied through the gun G.

The Power Supply Unit may be of the type disclosed in the Bichsel Patent 2,786,160. For clarity purposes certain of the identification used in the Bichsel patent have been adopted here. The Unit is provided with output terminals 29 and 39 which are connected between the electrode and the work, respectively, and is energized from the conductors L1, L2 and L3. The Unit includes variable transformers 61–63–65 having a ganged adjustable arm 91. The output potential which appears between the output conductors 29 and 39 may be set at any magnitude within limits by setting the adjustable arm 91 of the variable transformer. At any particular setting this potential is substantially constant within relatively small limits over the arc current range from zero load to full load. In accordance with this invention, variations in the Source potential are compensated by the Compensating Unit which operates to reset the potential between the output conductors 29 and 39 when a variation in the Source potential occurs.

The Compensating Unit includes a compensating motor M controlled from a pair of thyratrons 3TU and 4TU through relays 1CR and 2CR. The thyratrons 3TU and 4TU are respectively controlled from double triode 2TU which is in turn controlled from a balanced network which compares a potential proportional to the supply potential with a reference potential.

The proportional potential and the reference potential are both derived from a transformer T1, the secondary 1S1 of which charges a capacitor 1C through a rectifier 1RX and a capacitor 2C from a rectifier 2RX. The proportional potential is derived from capacitor 1C and for this purpose a resistor R1 voltage divider P7 and a variable resistor P1 are connected across the capacitor 1C. The adjusting arm 21 of the voltage divider P7 is connected through another resistor R2 to ground. There is thus a potential dependent on the setting of P7 across the latter resistor R2. The reference potential is derived from the capacitor 2C and for this purpose a plurality of resistors R4, R5, R6 and the voltage divider P6 are connected across the capacitor 2C. Across a pair of the resistors R5 and R6 and the voltage divider P6 a regulator tube 1TU is connected. This regulator tube assures that the potential across the resistors and the divider is maintained at a substantially constant magnitude. A portion of the potential across R5, R6, P6 is derived by the arm 23 of the voltage divider P6 and impressed across another resistor R3, preferably of the same magnitude as the resistor R2 from which the magnitude of P7 is impressed. The potentials between the two resistors R2 and R3 and ground are of opposite polarity and a potential equal to the difference of the two potentials is derivable from conductors O1 and O2 connected respectively to the junction of the arm 21 of P7 and the first resistor R2 and the arm 23 of P6 and the second resistor R3.

The double triode 2TU has a pair of anodes 31 and 41, a pair of cathodes 33 and 43, and a pair of grids 35 and 45. This double triode is supplied from a secondary 1S2 of another transformer T2 which derives its potential from the conductors L1 and L2 through a rectifier unit including a capacitor 3C and rectifier 3RX. The negative terminal of the unit is grounded. Resistors R7 and R8 and divider P2 and resistors R9 and R10 and divider P3 are respectively connected in series across the capacitor 3C. The anodes 31 and 41 are each connected from an anode resistor R11 and R12 to the positive terminal of the rectifier unit. The cathodes 33 and 43 are connected respectively to the adjusting arms 51 and 53 of voltage dividers P2 and P3. One of the grids 35 is connected directly to the output conductor O1 and the other 45 to the output conductor O2. The potentials impressed between these grids 35 and 45 and the respective cathodes 33 and 43 are then in effect equal to the potential across the associated resistor R2 or R3 of the balance network, and the conductivity of the branches of the double triode 2TU then depends on the difference of potential, if any, impressed across the resistors R2 and R3. The voltage dividers P2 and P3 may be set so that under any stable conditions the output of the double triode 2TU is balanced. The difference of potential will then appear across the output resistors R11 and R12 of the double triode 2TU only in situations in which there is a difference between the reference potential and the proportional potential which appears at the output conductors O1 and O2 of the balanced network.

Output conductors O3 and O4 are connected to the junctions of resistors R7 and R8 and R9 and R10. Output conductors O5 and O6 are connected respectively to the anodes 31 and 41 of the double triode 2TU. An output potential derivable from one of the sections of the double triode appears between conductors O3 and O5 and an output potential derivable from the other section appears between output conductors O4 and O6.

Each of the thyratrons 3TU and 4TU has an anode 60 and 71, a cathode 62 and 73 and a control electrode 64 and 75. One of the thyratrons is supplied from a secondary 2S1 of the transformer T1 and the other from a secondary 2S2 of the transformer T2. The relays 1CR and 2CR each have a coil, a normally closed contact 81 and 83 and a normally open contact 85 and 87. The anode 60 and the cathode 62 of one of the thyratrons 3TU is connected across the secondary 2S1 through the coil of the relay 1CR. The anode 71 and the cathode 73 of the other thyratron 4TU are connected across the secondary 2S2 through the coil of the relay 2CR. Conductor O3 is connected to the control electrodde 64 of the former thyratron 3TU through a grid resistor R13 and conductor O4 is connected to the control electrode 75 of the other through a grid resistor R14. Conductors O5 and O6 are connected respectively to the cathoddes 62 and 73 of the two thyratrons.

The motor M is of the type having a plurality of terminals 90, 93, 95 and is supplied from auxiliary conductors AL1 and AL2 which may derive their power from the Source conductors L1, L2, L3. One of the terminals 90 is connected to conductor AL2. The other terminals 93 and 95 are respectively adapted to be connected to conductor AL1 through a limit switch LS10, the normally closed contact 83 of the relay 2CR and the normally open contact 85 of relay 1CR or limit switch LS11, the normally open contact 87 of relay 2CR and the normally closed contact 81 of relay 1CR. Thus, current may flow through either of the terminals 93 or 95 depending on whether relay 1CR or 2CR is actuated. The flow of current from conductor AL1 through one of the terminals 93 causes the motor M to rotate in one direction and the flow of current through the other terminal 95 causes the motor M to rotate in the other direction.

The shaft of the motor M is connected through a pair of sprocket wheels 101 and 103 and a chain 105 to the adjusting arms 91 of the variable transformers. The shaft of the motor is also connected to the adjusting arm 21 of the voltage divider P7. The limit switches LS10 and LS11 open the motor circuit if the motor rotates beyond limiting positions. The mechanical connections between the motor shaft and the variable transformers 61–63–65 and voltage-divider adjusting arms 21 are such that when the motor M is rotated to set the variable transformers so that compensation is introduced in the Power Supply Unit in a predetermined sense, the arm 21 of the voltage divider P7 is set so that the difference of potential appearing between the output conductors O1 and O2 is reduced to zero when the point of adequate compensation is reached.

Figure 5:
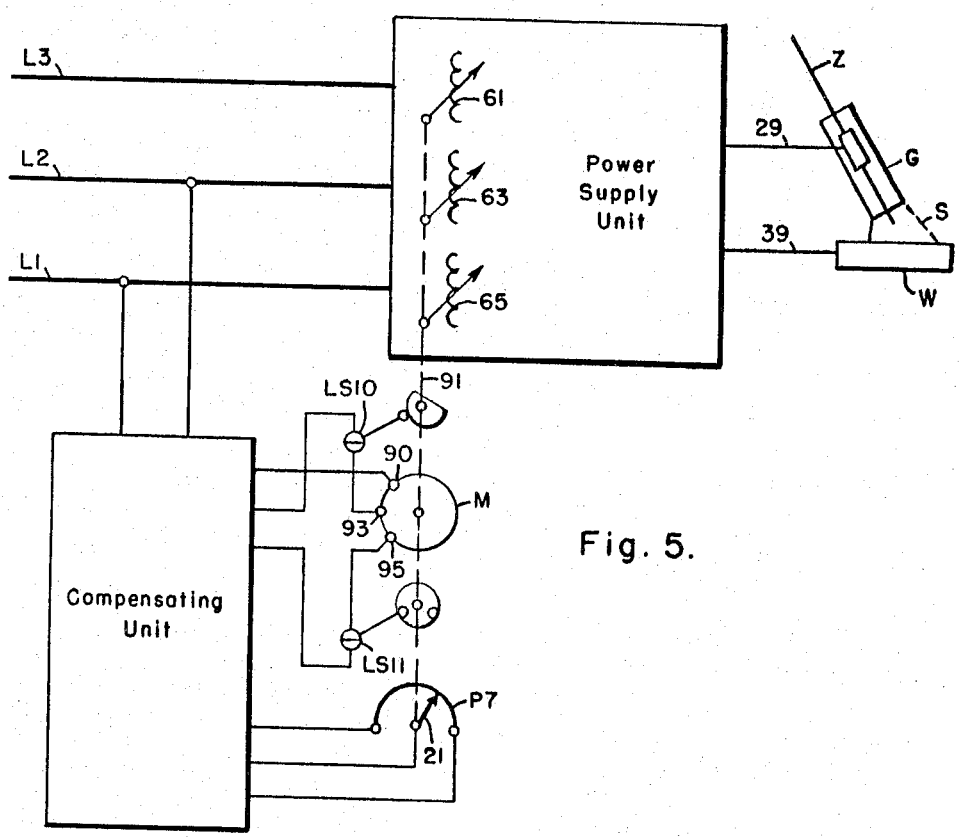
FIG. 5 is a block diagram showing a preferred embodiment of this invention.
Figure 6:
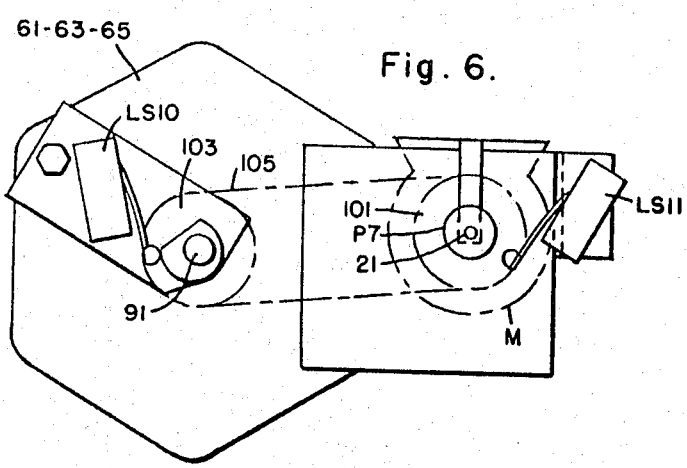
FIG. 6 is a fragmental diagrammatic view showing an important feature of this invention.
Figure 7:
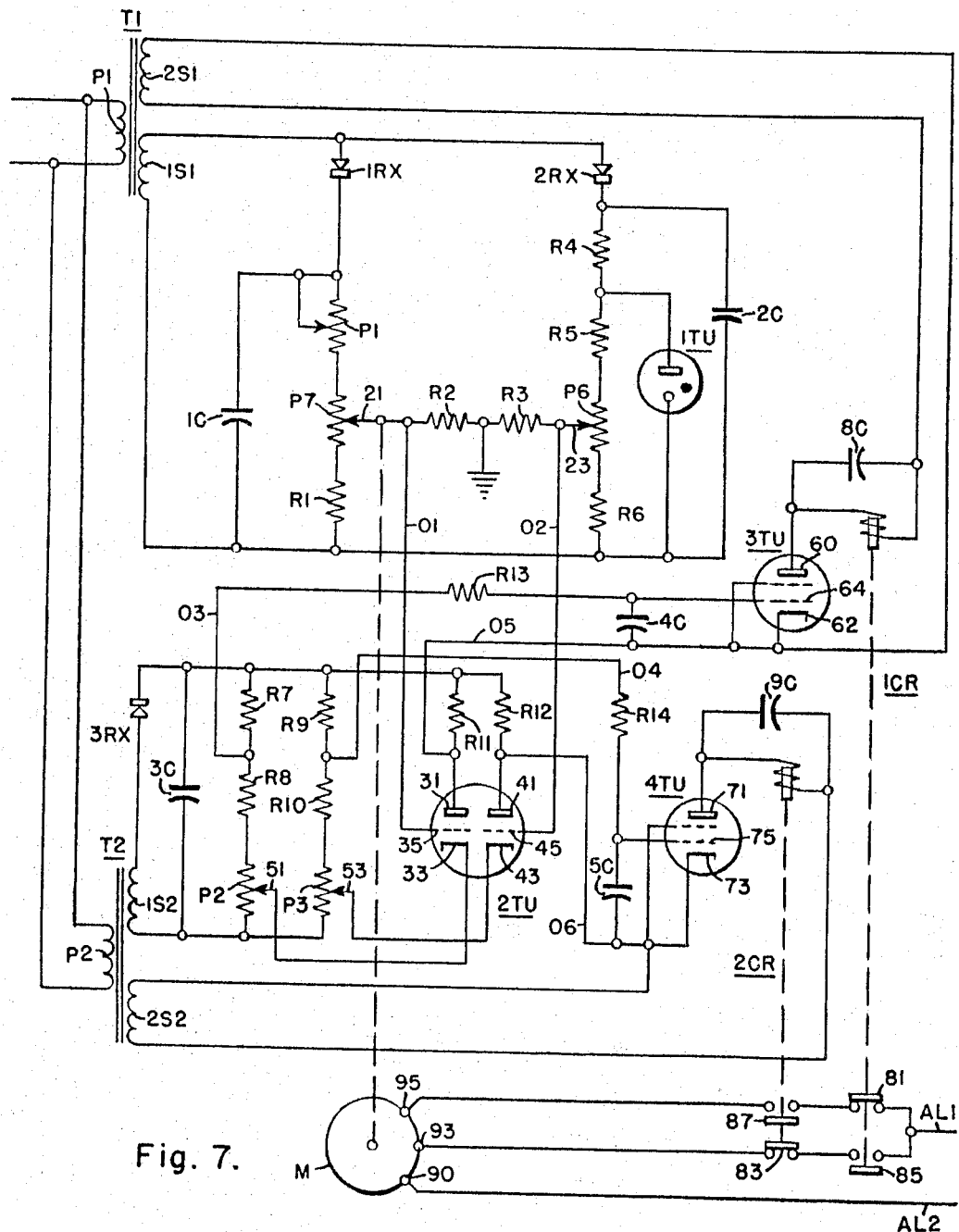
FIG. 7 is a circuit diagram of the preferred embodiment of this invention shown in FIG. 5.
Figure 8:
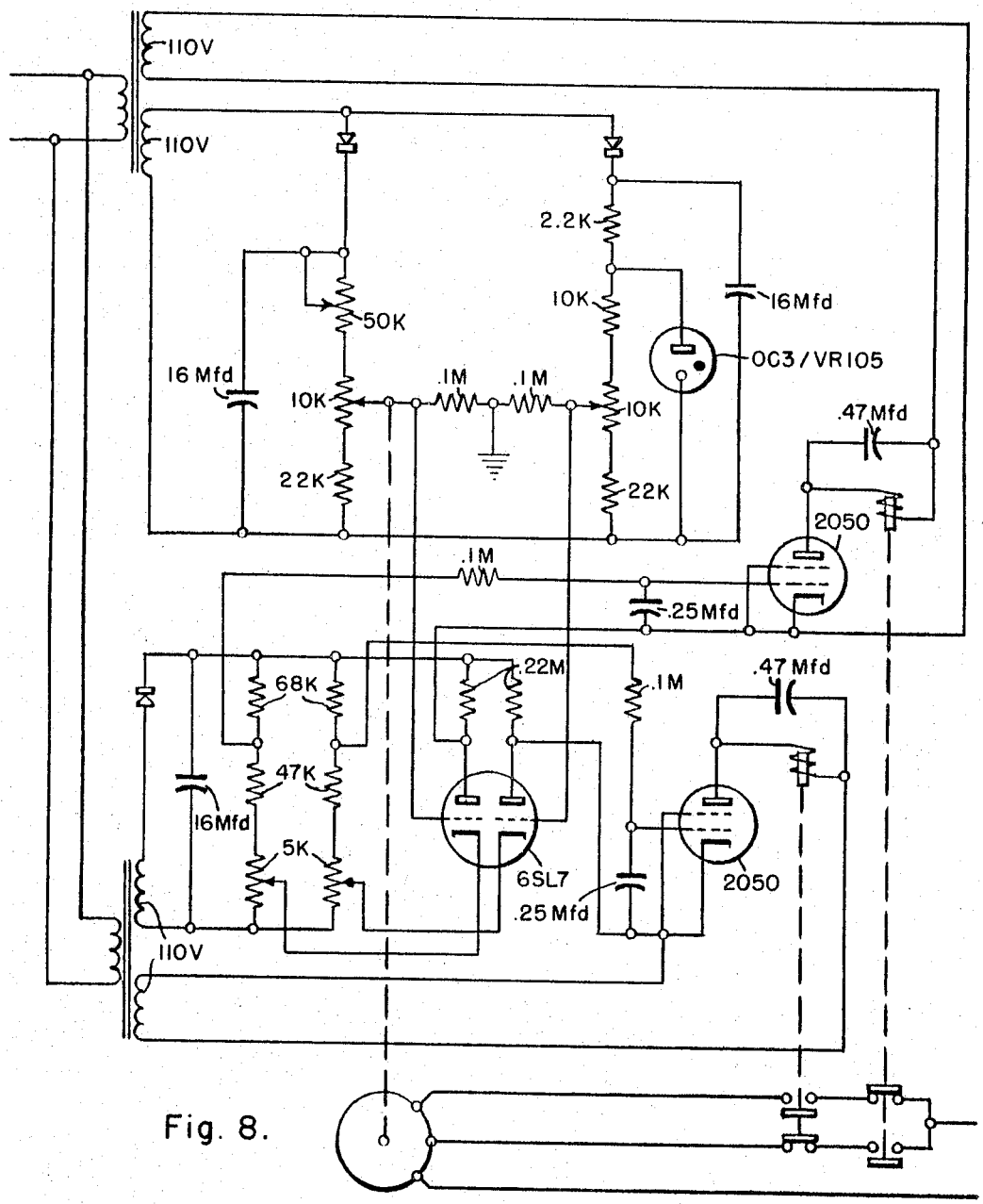
FIG. 8 is a circuit diagram similar to FIG. 7 but showing the magnitudes of the various components included in a Compensating Unit which was found to operate satisfactorily.

In the operation of the apparatus, the Power Supply Unit, the Compensating Unit, the gun G and the work W are connected as shown in FIG. 5. The adjusting arm 23 of the voltage divider P6 is then set to a position at which the output between conductors 29 and 39 of the Power Supply Unit has the proper magnitude for welding considering the materials to be welded, diameter of the welding electrode Z and the shielding gas to be used. The Compensating Unit then operates to set the arm 91 so that the potential of the Supply Unit is at the desired magnitude. In addition, the Balanced Network is balanced. The arms 51 and 53 may be set so that in this condition of the network the sections of the double triode 2TU are equally conducting and are operating on the straight-line portions of their characteristics.

The welding operation is then started by advancing the electrode Z so that the work W is engaged and thereafter withdrawing the electrode so that an arc is fired under the potential between conductors 29 and 39 between the electrode Z and the work W. The welding now proceeds.

If the supply potential should change so that a variation occurs in the potential impressed on the arm 21 of the voltage divider P7, a voltage difference appears between output conductors O1 and O2, the motor of the Compensating Unit is energized to move the arm 91 of the variable transformers 61–63–65 and to introduce a compensating change in the potential between conductors 29 and 39. At the same time the arm 21 of P7 is reset to reduce the difference of potential between conductors O1 and O2 to zero.

For example, assume that the supply potential increases so that there is an increase in the potential of the arm of P7 relative to ground. Under such circumstances O1 becomes electrically more positive than O2 and the current flow through the branch of the double triode 2TU associated with O1 increases while the current flow through the other branch decreases. The potential of the cathode 63 of the thyratron 3TU associated with O1 then becomes more negative and this thyratron becomes conducting while the potential of the cathode 73 of the other thyratron 4TU becomes more positive and this thyratron remains non-conducting. Relay 1CR is then actuated and the motor M rotates in a direction such as to produce the necessary compensation. A decrease in the potential causes the opposite change in the potentials between conductors O1 and O2 resulting in the conduction of 4TU and the rotation of the motor M in the opposite direction to produce the compensation.

It has been found in welding with the apparatus disclosed herein that a highly stable arc is produced. While this apparatus is of some advantage in hand welding, it is of particular advantage in semiautomatic and automatic welding.

While a preferred embodiment of this invention has been disclosed herein, many modifications thereof are feasible. This invention, then, is not to be restricted except insofar as is necessitated by the spirit of the prior art.

We claim as our invention:

1. Apparatus for arc welding work with a consumable electrode supplied with energy derived from a source the potential of which may vary, comprising in combination, a power-supply unit having means for setting the output potential of said unit, said output potential, at any potential setting, being substantially constant over the range from no load to full load, means for connecting said unit to said electrode and to said work to cause arc welding current to flow between said electrode and said work, and means connected to said source and connected to said setting means and responsive to said source potential, for actuating said setting means to compensate for variations in said source potential thereby suppressing excessive arc outages and stubbing.

2. Apparatus for arc welding work with a consumable electrode supplied with energy derived from a source the potential of which may vary, comprising in combination, a power supply unit having means for setting the output potential of said unit, said output potential, at any potential setting, being substantially constant over the range from no load to full load, first means connected to said source for producing a potential substantially proportional to said source potential, second means connected to said source for producing a reference potential, means connected to said first and second means for comparing said proportional and reference potential, means connected to said comparing means and to said setting means and responsive to any unbalance between said proportional and reference potential for compensating for said unbalance, and means connected to said compensating means and to said first means for resetting said proportional potential so that said proportional potential and said reference potential are balanced.

3. Apparatus for supplying a load from a source having a potential which may vary, comprising a power supply unit including means for varying the potential output of said unit, means connecting said unit in power supplying relationship between said source and said load, first means connected to said source for deriving a potential proportional to said source, said first means including a first impedance for setting the magnitude of said proportional potential, second means for deriving a reference potential, said second means including a second impedance for selectively setting the magnitude of said reference potential, means connected to said first means and to said second means for balancing said proportional potential against said reference potential at any setting of said reference potential, means connected to said balancing means and to said varying means and responsive to an unbalance between said proportional and reference potentials for actuating said varying means to compensate for said unbalance, and means connected to said actuating means and to said first impedance and responsive to the compensating actuation of said varying means for resetting said first impedance to suppress said unbalance.

4. Apparatus for arc welding work with a consumable electrode supplied with energy derived from a source the potential of which may vary, comprising in combination, a power supply unit having means for setting the output potential of said unit, said output potential, at any potential setting, being substantially constant over the range from no load to full load, and means connected to said source and connected to said setting means and responsive to said source potential, for actuating said setting means to compensate for variations in said source potential, said responsive means including first selectively operable means for causing said responsive means to set said output potential at a preselected magnitude and second means electrically connected to said first means and actuable by said responsive means to be set to correspond to the setting of said selectively operable means to terminate the setting operation of said responsive means.

5. In an electric arc welder having welding electrodes and a line to said electrodes, the combination of controllable means for varying the power supplied through said line to said electrodes and including variable electrical component means which may be set for different powers by mechanical movement, a motor and means coupling the motor to the component means and means for reversing the direction in which the motor drives the component means, and means for independently and selectively controlling said motor in both said directions and comprising separate rheostat means, one for controlling said motor in the direction in which it drives the component means to build up the power supplied for welding in said line and another for controlling said motor in the direction in which it drives the component means to decay the power supplied for welding in said line.

6. The apparatus of claim 5 wherein the means for controlling the motor includes first valve means for controlling the motor in one direction and second valve means for controlling the motor in the opposite direction, each said valve means having a control electrode, the rheostat means for each direction being connected to the corresponding control electrode.

References Cited

UNITED STATES PATENTS 2,625,675　1/1953　Lupo _____ 323—4
2,951,972　9/1960　Pomazal _____ 315—311

RICHARD M. WOOD, *Primary Examiner.*